United States Patent [19]

Kawano et al.

[11] Patent Number: 4,674,378
[45] Date of Patent: Jun. 23, 1987

[54] SHEARING MACHINE

[75] Inventors: Susumu Kawano, La Habra; Masanori Shimojima, Fullerton, both of Calif.

[73] Assignee: U.S. Amada Limited, Buena Park, Calif.

[21] Appl. No.: 781,012

[22] Filed: Sep. 27, 1985

[51] Int. Cl.⁴ ............................................. B26D 7/26
[52] U.S. Cl. ...................................... 83/368; 83/365; 83/636
[58] Field of Search ................. 83/368, 365, 563, 636, 83/72, 640

[56] References Cited

U.S. PATENT DOCUMENTS

| | | | |
|---|---|---|---|
| 4,281,696 | 8/1981 | Howard et al. | 83/365 X |
| 4,507,997 | 4/1985 | Ikeda | 83/368 |
| 4,541,722 | 9/1985 | Jenks | 83/365 X |
| 4,557,019 | 12/1985 | Van Devanter et al. | 83/365 X |
| 4,559,854 | 12/1985 | Jürgens | 83/365 X |

Primary Examiner—James F. Coan
Attorney, Agent, or Firm—Wigman & Cohen

[57] ABSTRACT

The invention relates to a shearing machine comprising of upper and lower blades with a non-contact detection means for measuring the thickness of a work piece. The machine also has a control means for adjusting the clearance between the upper and lower blades of the shearing machine to a value matching the plate thickness.

12 Claims, 15 Drawing Figures

SHEARING MACHINE

BACKGROUND OF THE INVENTION

1. Field of the Invention

This invention relates to a shearing machine which shears plates. More specifically, it relates to a shearing machine in which the thickness and width of the work piece are automatically detected. Based on these values the clearance between upper and lower blades and the rake angle are automatically adjusted, and in addition the stroke range of the ram which holds the upper blade is automatically adjusted.

2. Description of the Related Art

Previously, in order to use a shearing machine to perform good quality shearing operations with high efficiency, it was necessary to adjust the clearance between the upper and lower blades and the rake angle according to the machinability and thickness of the work piece to be sheared.

In addition, it was necessary to adjust the stroke range of the ram which holds the upper blade according to the shearing length of the work piece to prevent unnecessary shearing action beyond the end of the work piece.

Specifically, the clearance and rake angle have to be increased for work pieces of low machinability and thick work pieces to keep the necessary shearing force low, while for work pieces of short shearing length the stroke range has to be shortened so that shearing will be complete with a small amount of lowering of the ram, thus performing high quality shearing at high efficiency.

Among the characteristics of the work piece mentioned above, changes in material properties of the work piece do not occur so much and can usually be judged by usual inspection, but the thickness and shear length can change with every lot so frequent adjustment for them is necessary.

Previous shearing machines require that the work piece thickness and shear length be measured by hand everytime they changed, and then the clearance and rake angle between the upper and lower blades and the ram stroke range have to be adjusted manually according to the measured values, which was complicated and inefficient.

SUMMARY OF THE INVENTION

This invention was conceived in order to remove the above-described inconveniences in using an existing shearing machine, by providing a shearing machine which automatically and instantaneously detects the thickness and shear length of each work piece transported into the machine and, based on those values, computes and automatically adjusts the clearance and rake angle between upper and lower blades and the stroke range of the upper blade.

DETAILED DESCRIPTION OF THE PREFERRED EMBODIMENT

Figure 1:
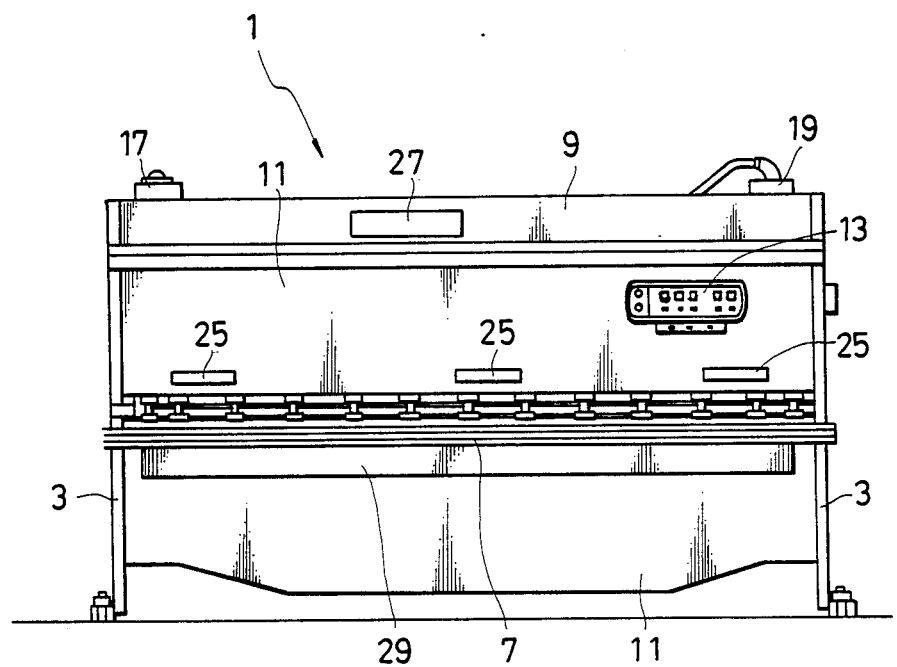
FIG. 1 is a front elevational view of a shearing machine which embodies this invention, wherein the upper blade is either raised and lowered along a guide with a hydraulic device, or moved swingably by an eccentric shaft supported by both side walls.

FIG. 1 is a front elevational view of a shearing machine (1) which embodies the present invention. The shearing machine (1) comprises standing side plates (3), and a strong front plate (5), table (7), crown section (9) and a lower front plate (11) all fastened between the side plates (3).

Part of the front plate (5) has a control section (13) which specifies back gauge dimensions and position, and controls such actions as starts and emergency stops. Provided on the right and left sides of the crown section are a large diameter hydraulic cylinder (17) (refer to FIG. 2) and a small diameter hydraulic cylinder (19) which drive a ram (15).

At the lower edge of the upper plate is a hold-down device (23) which fixes the work piece (21) to be sheared (refer to FIGS. 11 and 12) on the table (7) under pressure. In front of the plate hold-down device (23) on the table (7), a plurality of detection devices (25) for detecting the plate thickness (T) of the work piece (21) protrude out from the front plate (11).

In addition, on part of the table (7), there is a light reception cage (29), at a position corresponding to a lightsource (27) in the crown section (9), to detect the shear length (L) of the work piece (21).

Next, referring to FIGS. 2, 3, 4A and 4B, one example of a mechanism which automatically varies the rake angle α of the upper blade (31), which is attached to the lower end of the ram (15), with respect to the lower blade (33) (refer to FIG. 3) which is fixed to the rear shoulder of the table (7).

Figure 3:
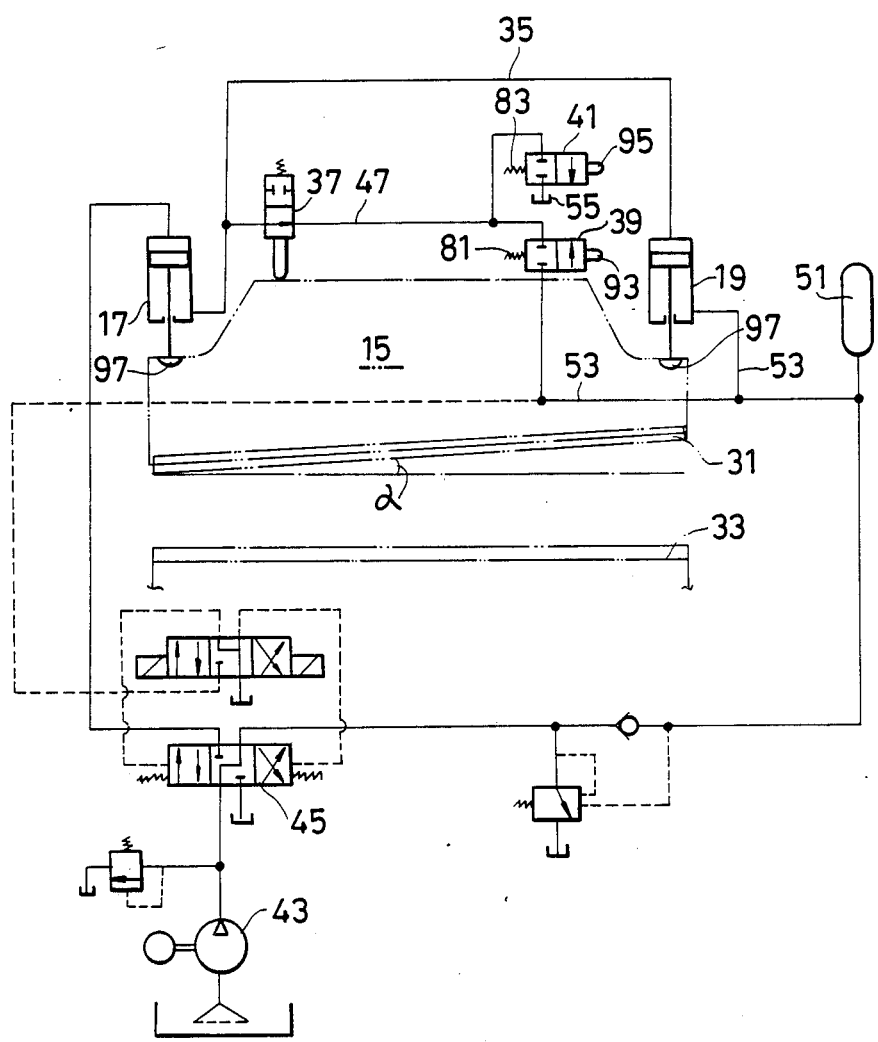
FIG. 3 is a hydraulic circuit diagram corresponding to FIG. 2.

First, in FIG. 3, which is a hydraulic piping diagram of a hydraulically operated shearing machine (1), the lower end of the large diameter hydraulic cylinder (17) is connected to the upper end of the small diameter hydraulic cylinder (19) through a hydraulic path (35). The cross sectional area of the upper chamber of the small diameter hydraulic cylinder (19) is made smaller than the cross-sectional area of the large diameter hydraulic cylinder (17) by a difference equal to the cross-sectional area of the piston rod.

Consequently, not only when the upper limit operation valve (37) is closed but even when, as shown in FIG. 3, the ram (15) is in its uppermost position so that the upper limit operation valve (37) is open, if the first rake angle adjustable valve (39) and the second rake angle adjustable valve (41) are closed, the rake angle ($\alpha$) of the upper blade (31) with respect to the lower blade (33) remains unchanged during operation of the shearing machine (1).

Specifically, when pressurized oil is delivered from the pump (43) at the top of the large diameter hydraulic cylinder (17) through the oil path switch valve (45), the piston of the large diameter hydraulic cylinder (17) drops, and the piston of the small diameter hydraulic cylinder (19) also drops, by exactly the same distance. Conversely, when pressurized oil is delivered from the pump (43) to the lower end of the small diameter hydraulic cylinder (19), the piston of the small diameter hydraulic cylinder (19) rises, and the piston of the large diameter hydraulic cylinder (17) also rises by the same distance, resulting in that there is no change in the rake angle $\alpha$.

Figure 2:
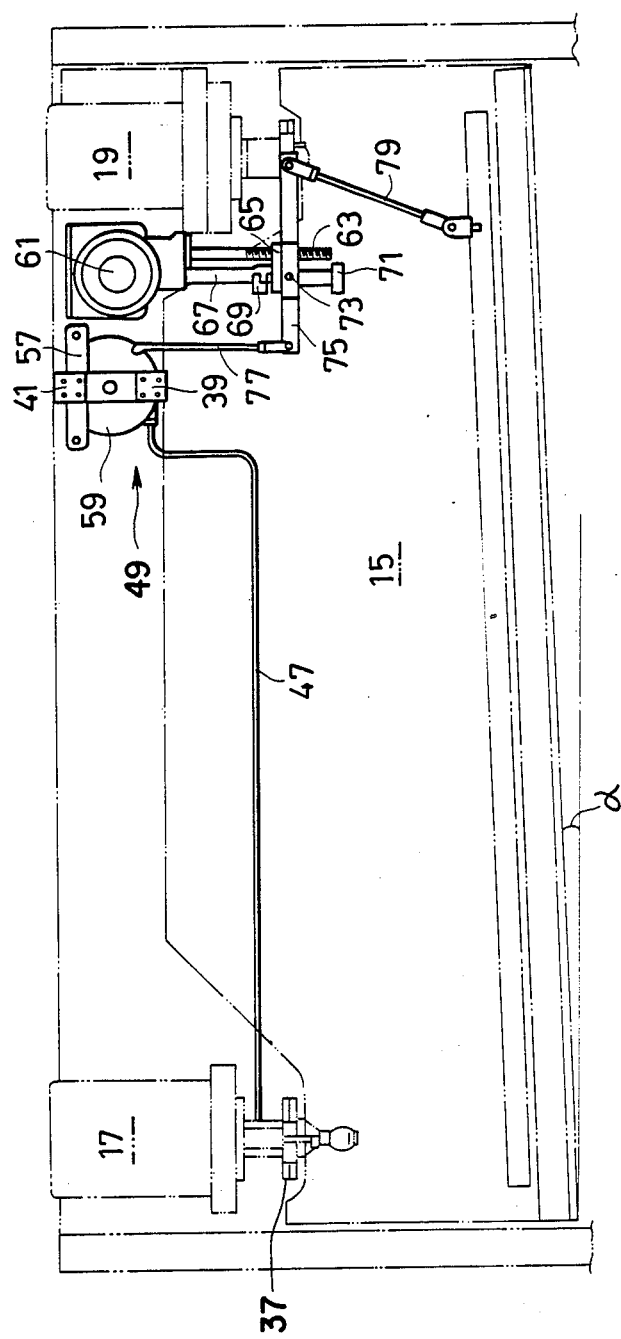
FIG. 2 shows a rake angle adjustment hydraulic piping for a shearing machine as shown in FIG. 1 in which the upper blade is raised and lowered along a guide groove by a hydraulic device.

FIG. 2 shows the rake angle selection valve (49) which is installed in the pipe (47) which leads from the upper limit operation valve (37) on one side to the first rake angle adjustment valve (39) and the second rake angle adjustment valve (41) on the other.

This selection mechanism (49) is connected to the pipe (47), the pipe (53) leading to the accumulator (51) and the drain pipe (55) which is behind the second rake angle adjustment valve (41), and, like the large diameter hydraulic cylinder (17) and the small diameter hydraulic cylinder (19), it comprises a disk-type surface cam (59) supported by a cross-shaped bracket (57) to the crown section (9), as shown in FIG. (2).

As is clear from FIG. 2, there is a servomotor (61) in the crown section (9) of the shearing machine (1). Its forward or reverse rotation rotates a lead screw (63). A slider (65) which is screwed into the lead screw (63) is guided by the guide bar (67) vertically mounted in the crown section (9).

Mounted on the guide bar (67) are the upper and lower limit switches (69) and (71) for the slider (65) to control the upper and lower limits of its motion.

Pivoted on the slider (65) by the shaft pin (73) is seesaw-type lever (75) which at one end is linked to part of the surface cam (59), and at the other end coupled to an appropriate position near the end of the ram (15) by the link (79) so that it is free to swing.

The first rake angle adjustment valve (39) and the second rake angle adjustment valve (41) are of nearly the same dimension and shape. They might, for example, be mounted above and below a cross bracket (57), as shown in FIG. 4B to function as poppet check valves with the resilient members (81) and (83) provided at their center holes.

The surface cam (59) holds the steel balls (89) and (91), in such a way that they are free to roll, in the ball receiving holes (85) and (87) in the vertical plate of the cross bracket (57). The poppets (93) and (95) press the steel balls (89) and (91) against the surface cam (59) by the biasing force of the resilient members (81) and (83).

Figure 4A:
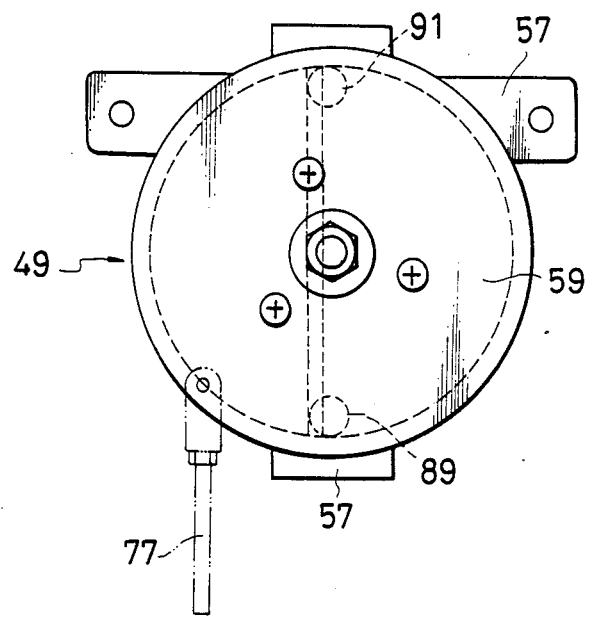
FIGS. 4A and 4B are, respectively, a top plan view and a central cross sectional view showing the construction of the cam rotation valve in the hydraulic circuit diagram of FIG. 3.

The part of the surface cam (59) shown by the two dotted lines in the middle of FIG. 4A is a slanting surface; the part to the left of that is thick, and the part to the right is thin.

Figure 4B:
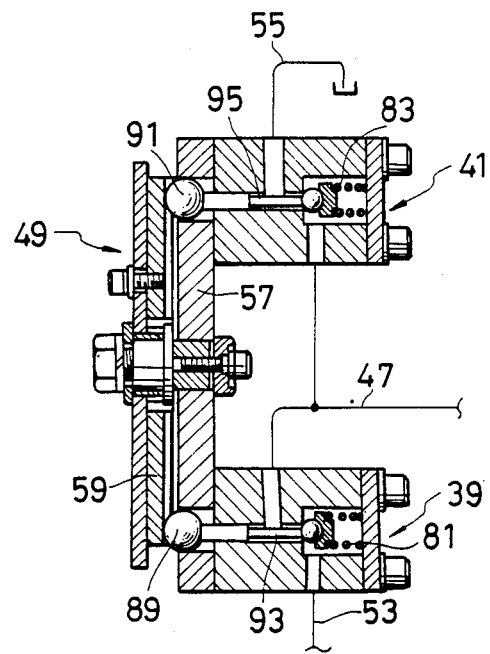

Consequently, when the slanting surface shown by the dotted lines in FIG. 4A is vertical, then, as shown in FIGS. 4B and 3, both the first rake angle adjustment valve (39) and the second rake angle adjustment valve (41) are closed. When the surface cam (59) rotates from this position, no matter which way it rotates, one of the valves will open while the other one remains closed.

Hence, when, for example, the plate thickness detection device (25) detects the plate thickness (T) of the work piece (21) transported onto the table (7) and issues an instruction to increase the rake angle $\alpha$, the ram (15) is naturally placed at its uppermost stop position. In addition, as shown in FIG. 3, the upper limit operation valve (37), the first rake angle adjustment valve (39) and the second rake angle adjustment valve (41) are closed, and the seesaw lever member (75) is nearly horizontal, as shown in FIG. 2.

In addition, the slanting part of the surface cam (59), shown by the dotted lines, is nearly vertical, and the rake angle adjustment valves (39) and (41) are both closed.

When the instruction to increase the rake angle ($\alpha$) is given, the servomotor (61) rotates by just a necessary amount to raise the slider (65) through the lead screw (63).

The right end of the ram (15) shown in FIG. 2 is still at the rake angle ($\alpha$) and the right end of the seesaw lever member (75) is coupled to the ram (15) through the link (79) and is motionless, so the seesaw lever member (75) rotates around the shaft pin (73), the left side rising and the right side falling.

Consequently, the link (77) rotates the surface cam (59) counterclockwise in FIG. 2 (clockwise in FIG. 4A).

This rotation of the surface cam (59) opens the second rake angle adjustment valve (41), while the No. 1 rake angle adjustment valve (39) remains closed.

Thus, the piston of the small diameter hydraulic cylinder (19) receives the set hydraulic pressure from the accumulator (51) on its lower surface, so the pressurized oil inside the pipe (35) is expelled from the drain circuit (55) of the second rake angle adjustment valve (41).

As a result of this, the piston of the small diameter hydraulic cylinder (19) rises, so the right end of the ram (15) rises, as shown in FIGS. 2 and 3, increasing the rake angle ($\alpha$), and the seesaw lever member (75) gradually returns to its former horizontal position, giving the desired increase in the rake angle ($\alpha$).

The reason that the seesaw lever member (75) returns to its former horizontal position is that the ram (15) has arrived at the new rake angle ($\alpha$) and all valves have returned to the conditions shown in FIGS. 3, 4A and 4B.

A similar action takes place when the rake angle ($\alpha$) of ram (15) is reduced. Pressurized oil flows from the accumulator pipe (53) into the connecting pipe (35) between the large diameter hydraulic cylinder (17) and the small diameter hydraulic cylinder (19) due to the pressure difference caused by the difference in area of the upper and lower surfaces of the piston of the small diameter hydraulic cylinder (19).

Since the remainder of the operation is exactly analogous to the case of increasing rake angle, a detailed discussion is omitted here.

Next, referring to FIGS. 5A and 5B, the clearance adjustment mechanism of the hydraulic type shearing machine (1) shown in FIG. 3 is described hereinafter.

Figure 5A:
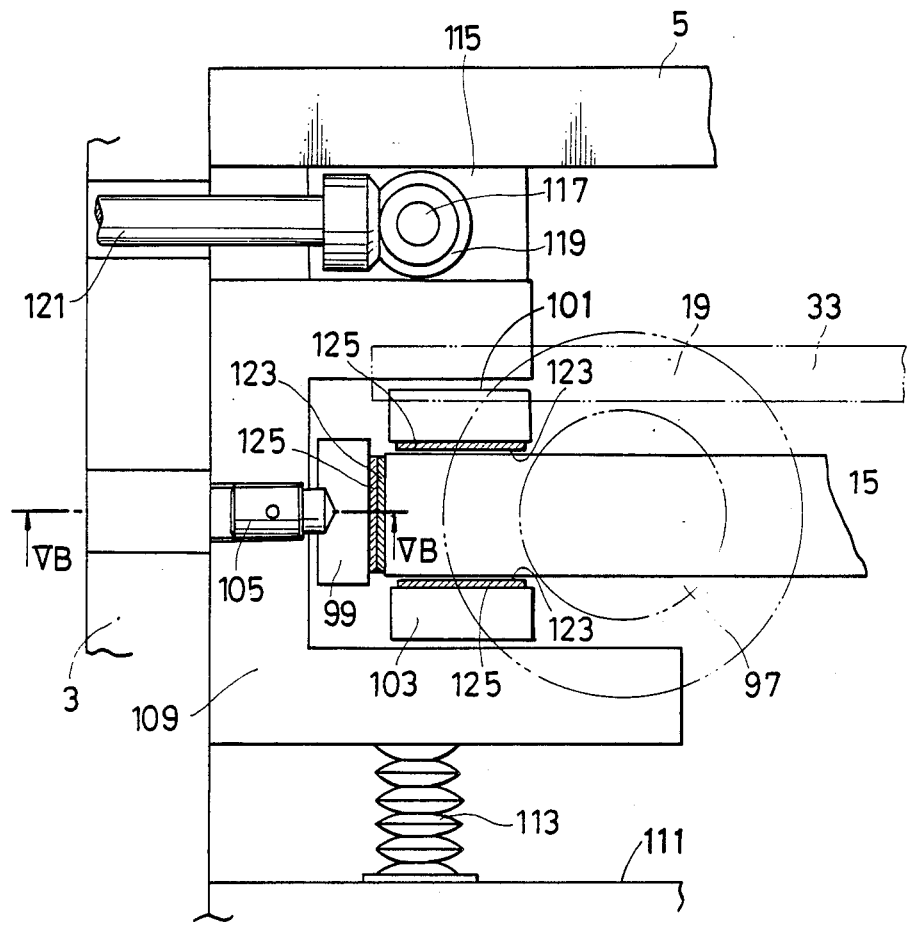
FIGS. 5A and 5B are partial cross-sections of a guide means, which guides the ram of the hydraulic shearing machine shown in FIG. 3.

FIG. 5A shows a top plan view of one end of the ram (15) seen from above the small diameter hydraulic cylinder (19) shown in FIG. 1. The lower blade (33) shown in the figure is attached to the rear shoulder of the table (7).

The upper blade (31) (not shown in the figure) is on the lower blade (33) side of the bottom end of the ram (15). The upper end of the ram (15) is connected through a ball joint (97) to the lower end of the piston of the small diameter hydraulic cylinder (19) so as to change the inclination angle so that the rake angle ($\alpha$) can be freely adjusted.

In addition, the bottom end of the ram (15) moves close to and from the lower blade (33) such that the clearance (CL) between the lower blade (33) and the upper blade (31) (refer to FIG. 8) can be freely varied.

That is to say, the design is such that the channel block (109) is formed by fixing with the forcing bolt (105) and the pulling bolt (107) the three guide plates (99), (101) and (103) which guide the opposite ends of the ram (15), and surrounded by the front plate (5), the side plates (3) and the rear plate (111).

Figure 5B:
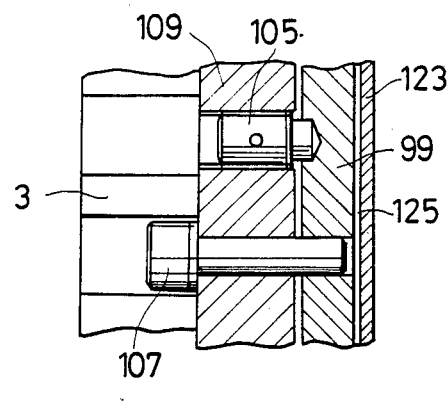

As shown in FIG. 5B, this channel block (109) slidably moves only horizontally, for example by the head of the pulling bolt (107) being constrained in the groove in a side plate (3), and is biased toward the front plates (5) by, for example, the strong resilient member such as a plate spring (113).

Also, between the front plate (5) and the channel block (109), there is a sliding, rising and falling body (115) which contacts the channel block (109) along an inclined surface. It is screw-coupled to the bevel gear shaft (117) so that it is free to rise and fall.

The bevel gear shaft (117) has a bevel gear (119) at its top end, and the bevel gear (119) is rotated forward and backward by the corresponding horizontal bevel gear shaft (121).

The three guide plates (99), (101) and (103) are provided at a portion contacting the ram (15) with a smooth metal object (123) such as a greased bearing by a joining material (125) such as brazing.

Thus, by causing the bevel gear shaft (121) to rotate forward or in reverse by a servomotor to a clearance (CL), which matches the thickness (T) of the work piece (21), the channel block (109) is moved up or down in FIG. 5A and thereby positioned at the desired clearance (CL).

Figure 6:
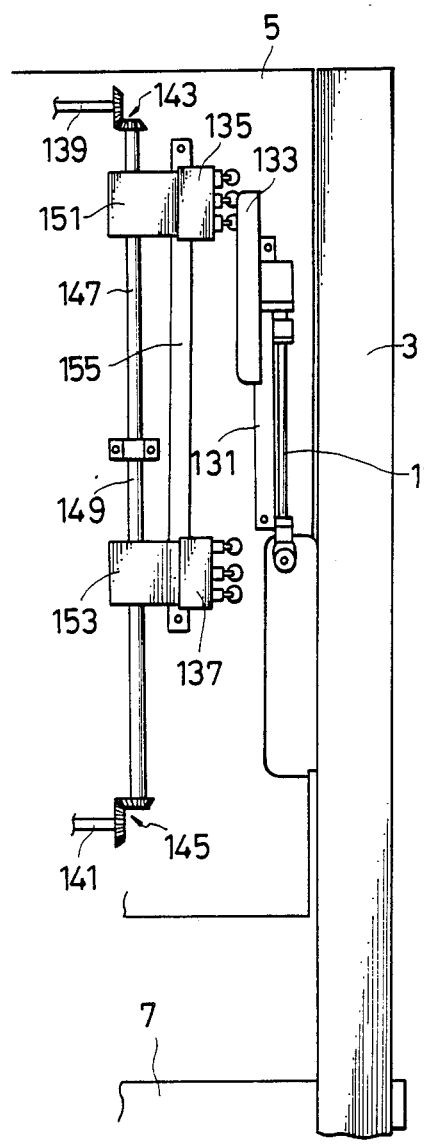
FIG. 6 is a rear elevational view to explain the mechanism installed on one side of the ram shown in FIG. 3, which adjusts the ram stroke.
Figure 7:
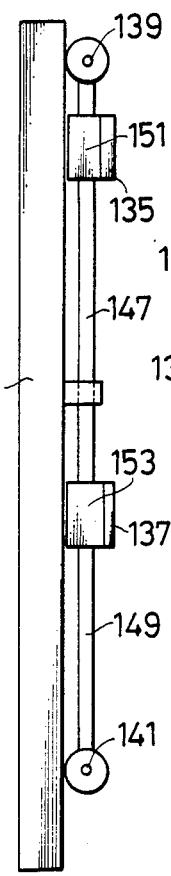
FIG. 7 is a left side elevational view of FIG. 6.
Figure 8:
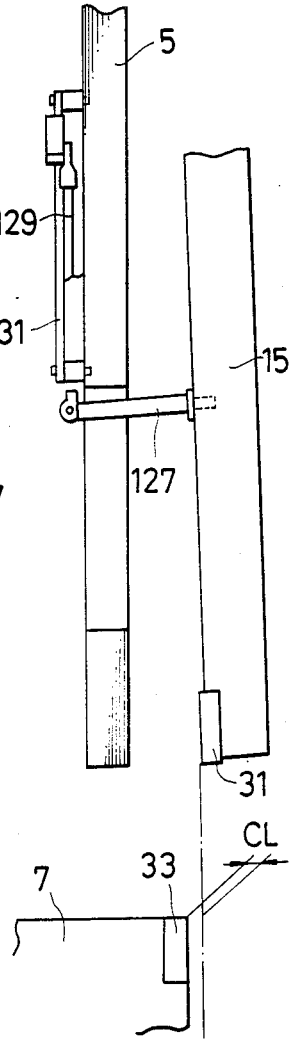
FIG. 8 is a right side elevational view of FIG. 6.

FIGS. 6, 7, and 8 show examples of mechanisms which automatically adjust the stroke range (S) in correspondence with the shear length (L) of the work piece (21).

The coupling rod (127) which is attached to one part of the ram (15) in FIG. 8 passes through the long vertical hole in the front plate (5) to the front where it is coupled to the vertical link (129). The movement of this link (129) in turn is coupled to the guide (133) which is free to rise and fall along the guide bar (131).

Separately attached to the front plate (5) are the bevel gears (139) and (141), which are rotated in forward or reverse by (for example) a servomotor to move and position the upper limit setting limit switch group (135) and the lower limit setting limit switch group (137) corresponding to the shear length (L).

Rotation of these bevel gear shafts (139) and (141) is transmitted to the vertical lead screws (147) and (149) by the bevel gears (143) and (145), which form pairs with the bevel gears (139) and (141), respectively. The upper limit setting limit switch group (135) and the lower limit setting limit switch group (137) are moved and positioned along the vertical guide bar (155) by the screw-coupled nut members (151) and (153).

The limit switch groups (135) and (137) each have three separate limit switches for deceleration, slowing almost to a stop, and stopping.

Figure 10A:
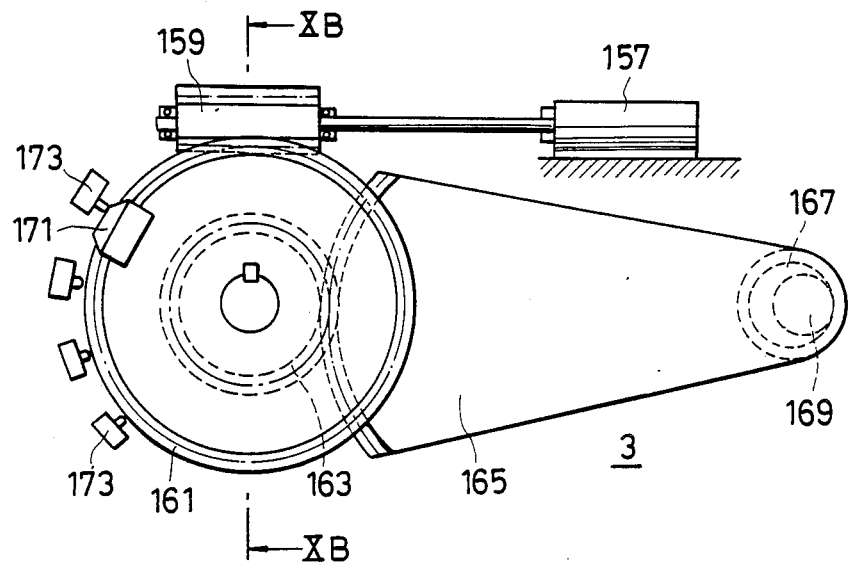
FIG. 10A is a diagram of the automatic clearance adjustment mechanism in a hydraulically driven swingable type shearing machine.
Figure 10B:
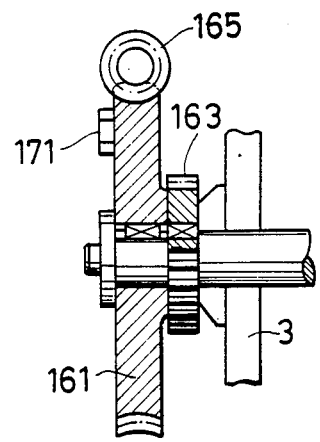
FIG. 10B is a view in the direction of the arrows along the section B—B in FIG. 10A.

FIGS. 10A and 10B show a second embodiment of this invention wherein a mechanism is provided for adjusting the clearance between the upper and lower blades of a swing type shearing machine.

A swing-type shearing machine is typically of the following construction. The side plates (3) have relatively great depth. At their rear is an eccentric shaft mounted nearly horizontally. Approximately triangular swingable arm members extend from the top and bottom ends of the opposite ends of the ram (15) so that they are free to swing with reference to the eccentric shaft. The right and left ends of the ram (15) are raised and lowered simultaneously to perform shearing between the upper and lower blades.

In such a swing-type shearing machine, then, for example, as shown in FIG. 10A, the worm gear (159) is driven in forward or reverse by an electric motor (157) such as a servomotor to match the thickness (T). This is converted to slow forward or reverse rotation for fine adjustment by the worm wheel (161) and then, through the integrally coupled rotating pinion gear (163) and sector gear (165), rotates the strong swing shaft (167) at the rear of the side plates.

Thus control and setting can be performed for a very small amount of advance or retreat of the eccentric shaft (169).

The eccentric shaft (169) rises or falls at the same time as it advances or retreats. Generally, a normal range for the clearance is 0.5 to 0.7 mm; since it never increases to more than 1 mm, even if the eccentric shaft (169) in the rear is raised or lowered by 1 mm, it has very little effect on product quality.

A guide (171) is attached to the worm wheel (161); the amount of clearance adjustment is detected by several limit switches (173) arranged at desired intervals around the outer circumference of the worm wheel (161) on the side plate (3).

Figure 11:
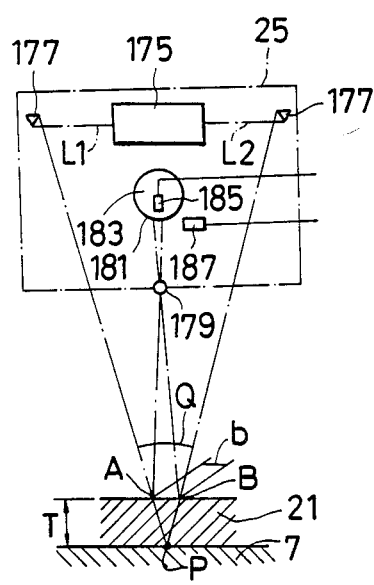
FIG. 11 shows an example of a plate thickness detection device.

FIG. 11 shows a device which automatically measures the plate thickness (T) of the work piece (21) using the monochromaticity of laser light. Suppose, for example, that there is a laser oscillator (175) which emits laser light beams $L_1$ and $L_2$ horizontally at a specified distance directly above a specified point on the work piece (21) which is transported onto the table (7) of a shearing machine (1).

The two light beams are reflected by a pair of reflecting mirrors (177), (177) on either side of the laser oscillator so that they are incident on the same point (P) on the upper surface of the table (7) at equal angles ½ Q.

When a work piece (21) having a thickness (T) is positioned at the point (P), then, as shown in FIG. 11, two light points A and B are obtained.

The light reflected from these light points A and B is focused on a rotating slit drum (181) by an object lens (179).

The light focused on the drum passes through a scanning slit and then is incident on a photoelectric element (185) inside the photoelectric signal converter (183). By measuring the distance between the pulse produced by this converter and the pulse from a separate pulse generator (187), the thickness (T) of the work piece (21) can be measured.

In this case, the relation between the distance (d) between the light points (A) and (B) on the work piece (21) and the thickness (T) of the work piece (21) is given by the following formulas:

$$T = d/2 \tan(Q/2)$$

$$d/2 = T \times \tan(Q/2)$$

That is, by measuring the distance (d) between the light points (A) and (B) the thickness (d) of the work piece can be measured.

Figure 12:
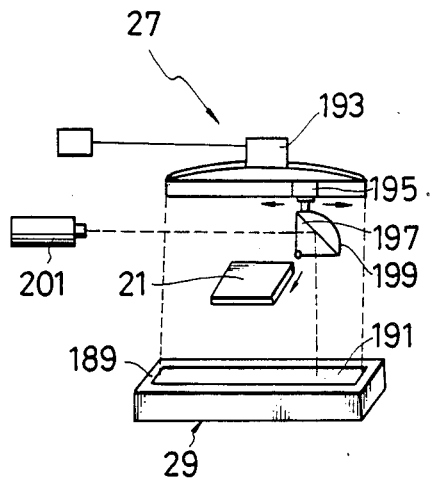
FIG. 12 shows an example of a shear length detection device.

FIG. 12 shows an example of a device which measures the shear length (L) of a work piece (21). A light receiving device (189) is installed to have its upper surface flush with the top of the table (7), as shown in FIG. 1. In its bottom are many small narrow photoelectric elements (not shown) at intervals of, for example, 1 mm.

On the top surface of the light receiving device (189) is a transparent window (191).

Above the light receiving device (189) is a reciprocating motion device (193) which moves parallel to the light receiving device (189). On its platform (195) is a reflecting frame (199) with a built-in prism (197).

A narrow spot beam of light is irradiated from a laser light source (201) on the prism (197) which reflects it at a right angle. It is moved back and forth so that the prism moves from one end to the other of the array of photoelectric elements inside the light receiving device, always shining on some part of the arrays.

Thus, if the work piece (21) is transported on top of this device in a direction perpendicular to the direction of reciprocating motion of the reciprocating motion device (193), the desired shear length (L) can be immediately detected.

Figure 9:
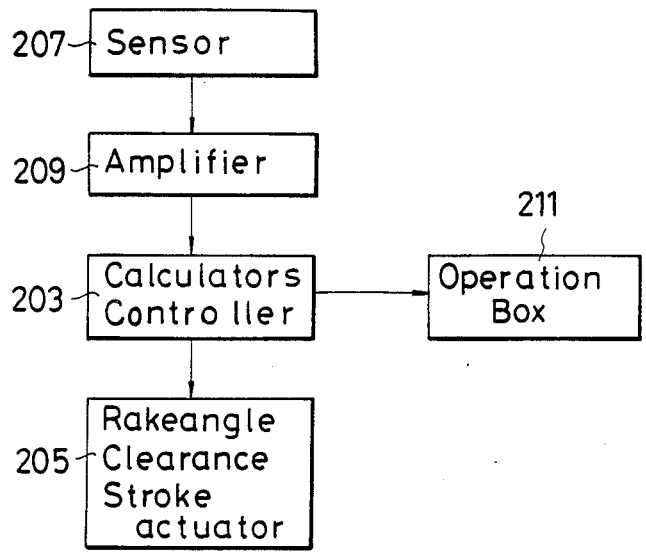
FIG. 9 is a control block diagram of the detection of work piece thickness and shear length, and adjustment of the clearance and rake angle between the upper and lower blades and the ram stroke range.

As shown in the block diagram in FIG. 9, the shearing machine of this invention, described in detail above, incorporates a computer device (203) in which certain data (205) characteristic of the machine are stored beforehand. These include the distance between the ball joints (97) of the large diameter hydraulic cylinder (17) and the small diameter hydraulic cylinder (19), the heights of the guide plates (99), (101) and (103), and the heights of the ball joints (97).

Next, data from sensors (207) such as the photoelectric elements (185) are amplified by the amplifier (209) and input to the computer (203). Based on this data plus the characteristic machine data, the computer sends the control box (211) instructions for adjustments in the rake angle, clearance and positions of upper and lower stroke limits.

Thus, a shearing machine of this invention, requires only that a workpiece be transported onto a table and the optimum settings for rake angle and clearance are automatically obtained, and in addition the stroke upper and lower limits which will reduce idle time to a minimum are obtained.

It is clear that design changes can be made without deviating from the technological scope of this invention, which therefore should not be limited to a literal interpretation of the claims.

What we claim is:

1. A shearing machine comprising:
    a frame;
    upper and lower blades vertically mounted on said frame for relative shearing movement therebetween;
    a worktable mounted on said frame for horizontally supporting a plate-shaped workpiece;
    a non-contact detection means for measuring the thickness of the workpiece;
    said non-contacting detection means including means supported on said frame vertically disposed above the surface of said workpiece for impinging a plurality of light beams disposed of an angle with respect to the vertical onto the top surface of said workpiece, means for detecting the angle at which said light beams are reflected from the top surface means for computing the thickness of the workpiece based on the detected angle at which said light beams are reflected from the surface of said workpiece; and
    control means responsive to said non-contact detection means for adjusting the clearance between the upper and lower blades of the shearing machine to a value matching said plate thickness.

2. The shearing machine as described in claim 1 further comprising a ram which holds the upper blade and is guided by a guide slide as it moves up and down.

3. The shearing machine as described in claim 2 in which the plate thickness of the work piece is measured by a non-contact detection means and the rake angle of the upper blade of the shearing machine is adjusted to match said value of plate thickness.

4. The shearing machine as described in claim 2 in which the shear length of the work piece is measured by a non-contact detection means and the stroke range of the ram which holds the upper blade is adjusted in position to match said shear length.

5. The shearing machine as described in claim 3 in which the shear length of the work piece is measured by a non-contact detection means and the stroke range of the ram which holds the upper blade is adjusted in position to match said shear length.

6. The shearing machine as described in claim 1 further comprising a ram which holds the upper blade and is swingably driven around an eccentric shaft which is attached to side plates.

7. The shearing machine as described in claim 6 in which the shear length of the work piece is measured by a non-contact detection means and the stroke range of the ram which holds the upper blade is adjusted in position to match said shear length.

8. A shearing machine comprising;
    a frame;
    upper and lower blades vertically mounted on said frame for relative shearing movement therebetween;
    a worktable mounted on said frame for horizontally supporting a plate-shaped workpiece;
    a ram vertically supported within said frame connected with one of said upper and lower blade for providing said relative shearing movement;
    first and second means mounted on said frame for driving said ram, said first and second ram driving means being independently adjustable to selectively vary the rake angle of the ram;
    a rake angle selection valve fixed to said frame and positioned between said first and second ram driving means so as to selectively operate said first and second ram driving means;

a non-contact detection means for measuring the thickness of the workpiece; and control means responsive to said non-contact detection means connected with said rake angle selection valve to selectively operate said first and second ram driving means to adjust said first and second ram driving means to selectively vary the rake angle of the ram in accordance with the thickness of the workpiece.

9. The shearing machine of claim 8 wherein said rake angle selection valve comprises a disc-type surface cam having a thick portion and a thin portion, said cam being rotatably mounted on said rake angle selection valve.

10. The shearing machine of claim 9 wherein said rake angle selection valve further comprises a first rake angle adjustment valve and a second rake angle adjustment valve, operatively connected to said first and second ram driving means, respectively, and means positioned between said disc-type surface cam and said first and second rake adjustment valves responsive to said thick and thin portions of said disc-type surface cam to operate said first and second rake adjustment valves when said disc-type surface cam is rotated.

11. The shearing machine of claim 10 further comprising a lever arm pivotably connected at one end to said disc-type surface cam to rotate said disc-type surface cam and connected at the other end to said ram, and means connected to said lever arm to pivot said lever in response to the thickness of the workpiece detected by said non-contacting detection means.

12. A shearing machine comprising:

a frame;

upper and lower blade vertically mounted on said frame for relative shearing movement therebetween;

a worktable mounted on said frame for horizontally supporting a plate-shaped workpiece;

drive means mounted on said frame for driving said ram, said drive means being adjustable to vary the stroke of the ram;

a non-contact detection means for measuring the length of the workpiece, said non-contact detection means including a light source positioned vertically above the workpiece supported on the worktable;

means for reciprocating the light source in the direction of the length of the workpiece;

a light receiving device positioned beneath the workpiece for cooperation with the light source to measure the length of the workpiece; and means for controlling the ram drive ram means to vary the stroke of the ram in response to the length of the workpiece.

* * * * *